(12) United States Patent
Iijima et al.

(10) Patent No.: US 8,395,748 B2
(45) Date of Patent: Mar. 12, 2013

(54) ELECTRO-OPTICAL DISPLAY DEVICE AND PROJECTOR

(75) Inventors: Chiyoaki Iijima, Ina (JP); Kazuhiro Nishida, Sapporo (JP); Katsumitsu Hama, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 311 days.

(21) Appl. No.: 12/792,436

(22) Filed: Jun. 2, 2010

(65) Prior Publication Data
US 2010/0309397 A1 Dec. 9, 2010

(30) Foreign Application Priority Data
Jun. 5, 2009 (JP) ................. 2009-135870

(51) Int. Cl.
*G02F 1/1333* (2006.01)
(52) U.S. Cl. .................. 349/158; 349/5; 349/113
(58) Field of Classification Search .............. 349/158, 349/113, 5, 117
See application file for complete search history.

(56) References Cited

U.S. PATENT DOCUMENTS

| | | | |
|---|---|---|---|
| 6,955,436 B2 * | 10/2005 | Watanabe | 353/122 |
| 6,982,181 B2 | 1/2006 | Hideo | |
| 7,310,127 B2 | 12/2007 | Sato et al. | |

FOREIGN PATENT DOCUMENTS

| | | |
|---|---|---|
| CN | 1580914 A | 2/2005 |
| JP | A-10-319878 | 12/1998 |
| JP | A-2004-240261 | 8/2004 |
| JP | A-2004-279498 | 10/2004 |
| JP | A-2004-311955 | 11/2004 |
| JP | A-2006-235010 | 9/2006 |
| JP | A-2007-293079 | 11/2007 |
| JP | A-2008-009455 | 1/2008 |

* cited by examiner

*Primary Examiner* — Thoi Duong
(74) *Attorney, Agent, or Firm* — Oliff & Berridge

(57) ABSTRACT

An electro-optical display device includes: a reflection-type liquid crystal panel that has a driving substrate, on which a reflective layer is disposed, and an opposing substrate facing each other with a liquid crystal interposed therebetween; and an light-transmissive substrate that is disposed on an outer side of the opposing substrate, wherein any one or more values of thermal expansion coefficients of a plurality of element substrates including at least the opposing substrate and the light-transmissive substrate are negative, and any one or more values of the thermal expansion coefficients of the plurality of element substrates are positive.

7 Claims, 5 Drawing Sheets

ELECTRO-OPTICAL DISPLAY DEVICE AND PROJECTOR

This application claims priority to Japanese Patent Application No. 2009-135870 filed in Japan on Jun. 5, 2009, the entire disclosure of which is hereby incorporated by reference in its entirety.

BACKGROUND

1. Technical Field

The present invention relates to an electro-optical display device for image formation and a projector in which the electro-optical display device is built.

2. Related Art

As electro-optical display devices that are built in a projector or the like, there are devices having a structure in which dust-protective substrates are attached on outer faces (light incident and outgoing side faces) of an opposing substrate configuring a reflection-type liquid crystal device or devices having a structure in which dust-protective substrates are attached on outer faces (light incident and outgoing side faces) of a driving substrate and an opposing substrate that configure a transmission-type liquid crystal device. Of such devices, in order to reduce display unevenness, an electro-optical display device, which is configured by a transmission-type liquid crystal device, using low-expansion glass having the absolute value of the average linear expansion coefficient that is equal to or lower than $10 \times 10^{-7}$ [/° C.] as a substrate material is proposed (see JP-A-2008-9455). In such a case, other than a liquid crystal substrate and the dust-protective substrates configuring the liquid crystal device, support substrates of one pair of polarizing plates disposed with the liquid crystal device interposed therebetween for displaying an image are also formed from low-expansion glass, and whereby suppressing the occurrence of a phase difference due to distortion. In addition, in JP-A-2008-9455, as examples of low-expansion glass, there are 7971 titanium silicate glass, silica glass, and the like.

Other than the above-described devices, there are electro-optical display devices that use a material such as silica glass, Neoceram (registered trademark), or the like having high thermal conductance as the material of the dust-protective substrates and the liquid crystal substrate (see JP-A-2006-235010 and JP-A-2004-311955).

However, even when low-expansion glass is used as a substrate material in transmission-type or reflection-type liquid crystal devices, generally, the linear expansion coefficient cannot be zero, and there is limitation on the decrease in display unevenness.

SUMMARY

An advantage of some aspects of the invention is that it provides an electro-optical display device that is configured to include a reflection-type liquid crystal panel and is capable of additionally suppressing display unevenness.

Another advantage of some aspects of the invention is that it provides a projector in which the above-described electro-optical display device is built.

According to an aspect of the invention, there is provided an electro-optical display device including: a reflection-type liquid crystal panel that has a driving substrate, on which a reflective layer is disposed, and an opposing substrate facing each other with a liquid crystal interposed therebetween; and an light-transmissive substrate that is disposed on an outer side of the opposing substrate. Any one or more values of thermal expansion coefficients of a plurality of element substrates including at least the opposing substrate and the light-transmissive substrate are negative, and any one or more values of the thermal expansion coefficients of the plurality of element substrates are positive. Here, the plurality of element substrates including at least the opposing substrate and the light-transmissive substrate represent substrates that are positioned on a side opposite to the driving substrate with respect to the liquid crystal.

In the above-described electro-optical display device, any one or more values of thermal expansion coefficients of a plurality of element substrates including at least the opposing substrate and the light-transmissive substrate are negative, and any one or more values of the thermal expansion coefficients are positive. Accordingly, a phase difference given to passing light due to distortion generated due to temperature distribution or the like within the element substrate having a negative thermal expansion coefficient and a phase difference given to passing light due to distortion generated due to temperature distribution or the like within the element substrate having a positive thermal expansion coefficient are operated to offset with each other. Therefore, the effect of a decrease in the phase difference achieved by the plurality of element substrates as a whole can be higher than the effect of a decrease in the phase difference achieved by decreases in the distortion of individual element substrates. As a result, the display unevenness of the electro-optical display device can be further suppressed.

According to a specific aspect of the invention, in the above-described electro-optical display device, when the thermal expansion coefficients of the opposing substrate and the light-transmissive substrate are $\alpha 1$ and $\alpha 2$, respectively, refractive indices of the opposing substrate and the light-transmissive substrate are $n1$ and $n2$, respectively, and values of thicknesses of the opposing substrate and the light-transmissive substrate are $d1$ and $d2$, respectively, it may be configured that the refractive indices $n1$ and $n2$ are within the range of $1.5 \pm 0.1$, and a product sum operation value $d1 \cdot \alpha 1 + d2 \cdot \alpha 2$ of the thicknesses and the thermal expansion coefficients is within the range of $0 \pm 9 \times 10^{-7}$ [mm/K]. In such a case, an unintended phase difference that is given to the luminous flux reciprocating through a combination of the opposing substrate and the light-transmissive substrate can be decreased in consideration of the thicknesses, the thermal expansion coefficients, and the like.

According to another aspect of the invention, in the above-described electro-optical display device, the product sum operation value $d1 \cdot \alpha 1 + d2 \cdot \alpha 2$ of the thicknesses and the thermal expansion coefficients may be within the range of $0 \pm 4 \times 10^{-7}$ [mm/K].

According to still another aspect of the invention, in the above-described electro-optical display device, a product sum operation value $n1 \cdot d1 \cdot \alpha 1 + n2 \cdot d2 \cdot \alpha 2$ of the refractive indices, the thicknesses, and the thermal expansion coefficients may be within the range of $0 \pm 12 \times 10^{-7}$ [mm/K]. In such a case, an unintended phase difference that is given to the luminous flux reciprocating through a combination of the opposing substrate and the light-transmissive substrate can be decreased in consideration of the refractive indices, the thicknesses, and the thermal expansion coefficients.

According to yet another aspect of the invention, in the above-described electro-optical display device, the product sum operation value $n1 \cdot d1 \cdot \alpha 1 + n2 \cdot d2 \cdot \alpha 2$ of the refractive indices, the thicknesses, and the thermal expansion coefficients may be within the range of $0 \pm 5 \times 10^{-7}$ [mm/K].

According to still yet another aspect of the invention, there is provided a projector including: at least one or more of the above-described electro-optical display devices; an illumination device that illuminates the at least one or more of the electro-optical display devices; and a projection lens that projects an image formed by the at least one or more of the electro-optical display devices. Here, the electro-optical display device serves as an optical modulation device for modulating illumination light.

The projector includes the above-described electro-optical display device. Accordingly, the projector can form an image in which display unevenness is suppressed, and whereby a high-quality image can be projected.

BRIEF DESCRIPTION OF THE DRAWINGS

The invention will be described with reference to the accompanying drawings, wherein like numbers reference like elements.

DETAILED DESCRIPTION OF EMBODIMENTS

Figure 1:
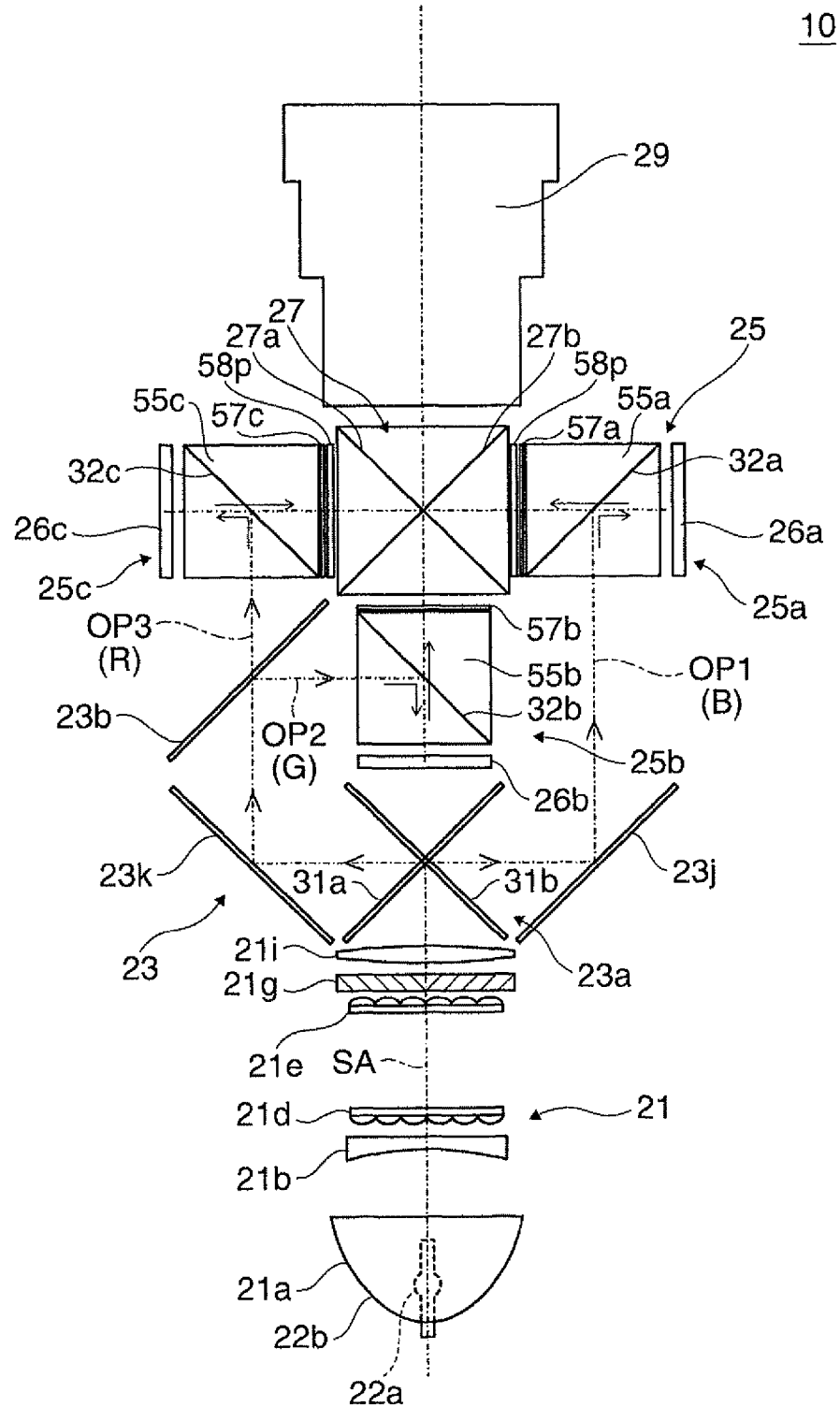
FIG. 1 is a diagram showing an optical system of a projector in which a liquid crystal unit according to a first embodiment is built.

FIG. 1 is a diagram illustrating the configuration of an optical system of a projector in which an electro-optical display device according to an embodiment of the invention is built.

This projector 10 includes: a light source device 21 that generates source light; a color separation light-guiding optical system 23 that separates the source light emitted from the light source device 21 into beams of three colors of blue, green, and red; an optical modulation unit 25 that is illuminated by illumination light of each color that is output from the color separation light-guiding optical system 23; a cross dichroic prism 27 that combines image light of each color that is output from the optical modulation unit 25; and a projection lens 29 that projects the image light that has passed through the cross dichroic prism 27 onto a screen (not shown).

The light source device 21 of the above-described projector 10 includes: a light source lamp 21a; a concave lens 21b; a pair of lens arrays 21d and 21e; a polarization converting member 21g; and a composite lens 21i. Of these components, the light source lamp 21a includes a lamp main body 22a that is, for example, a high-pressure mercury lamp and a concave mirror 22b that collects the source light and outputs the collected source light toward the front side. The concave lens 21b has a function of parallelizing the source light emitted from the light source lamp 21a. However, in a case where the concave mirror 22b is, for example, a paraboloidal mirror, the concave lens 21b may be omitted. One pair of the lens arrays 21d and 21e are respectively formed by a plurality of element lenses disposed in a matrix shape. The pair of the lens arrays 21d and 12e separate the source light transmitted from the light source lamp 21a through the concave lens 21b and individually collect and radiate the source light by using the element lenses. The polarization converting member 21g, although a detailed description thereof is omitted, includes a prism array in which a PBS and a mirror are built and a wavelength plate array that is attached to an outgoing face disposed on the prism array. This polarization converting member 21g converts the source light output from the lens array 21e, for example, into only linearly polarized light polarized in a first polarization direction that is perpendicular to the surface of FIG. 1 and supplies the polarized light to the next optical system. The composite lens 21i can illuminate liquid crystal light valves 25a, 25b, and 25c of respective colors, which are disposed in the optical modulation unit 25, in an overlapping manner by allowing the illumination light that has passed through the polarization converting member 21g to appropriately converge as a whole. In other words, the illumination light that has passed through both the lens arrays 21d and 21e and the composite lens 21i uniformly illuminates liquid crystal units 26a, 26b, and 26c of respective colors disposed in the optical modulation unit 25 through the color separation light-guiding optical system 23, to be described later in detail, in an overlapping manner.

The color separation light-guiding optical system 23 includes a cross dichroic mirror 23a, a dichroic mirror 23b, and reflective mirrors 23j and 23k. The color separation light-guiding optical system 23 configures an illumination device together with the light source device 21. Here, the cross dichroic mirror 23a includes a first dichroic mirror unit 31a and a second dichroic mirror unit 31b. The first dichroic mirror unit 31a reflects, for example, the blue (B) beam out of beams of three colors of blue, green, and red and transmits the green (G) beam and the red (R) beam. In addition, the second dichroic mirror unit 31b reflects the green (G) beam and the red (R) beam and transmits the blue (B) beam. The dichroic mirror 23b, for example, reflects the green (G) beam out of incident beams of two colors including green and red and transmits the red (R) beam. Accordingly, the B beam, the G beam, and the R beam configuring the source light are respectively guided by first, second, and third optical paths OP1, OP2, and OP3 so as to be incident to different illumination targets. Described in more detail, the source light emitted from the light source device 21 is incident to the cross dichroic mirror 23a. The B beam that is reflected and branched by the first dichroic mirror unit 31a of the cross dichroic mirror 23a is incident to a polarization beam splitter 55a of the liquid crystal light valve 25a through the reflective mirror 23j. In addition, the G beam that is reflected and branched by the second dichroic mirror unit 31b of the cross dichroic mirror 23a and is further reflected and branched by the dichroic mirror 23b through the reflective mirror 23k is incident to a polarization beam splitter 55b of the liquid crystal light valve 25b. Furthermore, the R beam that is reflected and branched by the second dichroic mirror unit 31b of the cross dichroic mirror 23a and is branched by passing through the second dichroic mirror 23b is incident to a polarization beam splitter 55c of the liquid crystal light valve 25c.

The optical modulation unit 25 includes three liquid crystal light valves 25a, 25b, and 25c in correspondence with three optical paths OP1, OP2, and OP3 for the above-described colors. Each of the liquid crystal light valves 25a, 25b, and 25c is a non-emission type optical modulation device that modulates the spatial distribution of the intensity of the incident illumination light.

Here, the liquid crystal light valve 25a for the B color that is disposed in the first optical path OP1 includes: the liquid crystal unit 26a that is illuminated by B beams; the polarization beam splitter 55a that is switched between the input and the output of the B beams to or from the liquid crystal unit 26a in accordance with the polarization state; a clean-up polarizing plate 57a that enhances the polarization separation characteristic of the polarization beam splitter 55a; and a half-wavelength plate 58p that is disposed on the most-outgoing-side. This liquid crystal light valve 25a is uniformly illuminated by the B beams reflected by the first dichroic mirror unit 31a. In the liquid crystal light valve 25a, a polarization separation element film 32a of the polarization beam splitter 55a selectively reflects linearly polarized light, which is polarized in the first polarization direction perpendicular to the surface of the figure, of the incident B beams so as to be guided to the liquid crystal unit 26a. The liquid crystal unit 26a is an embodiment of an electro-optical display device. The liquid crystal unit 26a converts the incident linearly polarized light polarized in the first polarization direction, for example, into linearly polarized light polarized in the second polarization direction that is partially parallel to the surface of the figure in accordance with an image signal and reflects the converted polarized light toward the polarization beam splitter 55a. The polarization separation element film 32a of the polarization beam splitter 55a selectively transmits only the linearly polarized light, which is modulated through the liquid crystal unit 26a, polarized in the second polarization direction. At this time, the extinction ratio of the outgoing side of the polarization beam splitter 55a can be raised by the clean-up polarizing plate 57a. Accordingly, the contrast of the modulated light can be enhanced. The half-wavelength plate 58p rotates the polarization direction of the linearly polarized light, which is transmitted through the polarization separation element film 32a of the polarization beam splitter 55a, polarized in the second polarization direction by 90 degrees so as to be converted into linearly polarized light polarized in the first polarization direction perpendicular to the surface of the figure. In the description above, the first polarization direction indicates a direction (a Y-axis direction, to be descried later) that is parallel to the line of intersection of a first and a second dichroic mirrors 27a and 27b of the cross dichroic prism 27. In addition, the second polarization direction indicates a direction (an X-axis direction to be described later) that is parallel to the above-described line of intersection.

The liquid crystal light valve 25b for the G color that is disposed in the second optical path OP2 includes: the liquid crystal unit 26b that is illuminated by G beams; the polarization beam splitter 55b that is switched between the input and the output of the beams to or from the liquid crystal unit 26b in accordance with the polarization state; and a clean-up polarizing plate 57b that enhances the polarization separation characteristic of the polarization beam splitter 55b. This liquid crystal light valve 25b is uniformly illuminated by the G beams reflected by the second dichroic mirror unit 31b and is reflected by the dichroic mirror 23b. In the liquid crystal light valve 25b, a polarization separation element film 32b of the polarization beam splitter 55b selectively reflects linearly polarized light, which is polarized in the first polarization direction perpendicular to the surface of the figure, of the incident G beams so as to be guided to the liquid crystal unit 26b. The liquid crystal unit 26b is an embodiment of an electro-optical display device. The liquid crystal unit 26b converts the incident linearly polarized light polarized in the first polarization direction, for example, into linearly polarized light polarized in the second polarization direction that is partially parallel to the surface of the figure in accordance with an image signal and reflects the converted polarized light toward the polarization beam splitter 55b. The polarization separation element film 32b of the polarization beam splitter 55b selectively transmits only the linearly polarized light, which is modulated through the liquid crystal unit 26b, polarized in the second polarization direction. At this time, the extinction ratio of the outgoing side of the polarization beam splitter 55b can be raised by the clean-up polarizing plate 57b. Accordingly, the contrast of the modulated light can be enhanced.

The liquid crystal light valve 25c for the R color that is disposed in the third optical path OP3 includes: the liquid crystal unit 26c that is illuminated by R beams; the polarization beam splitter 55c that is switched between the input and the output of the R beams to or from the liquid crystal unit 26c in accordance with the polarization state; a clean-up polarizing plate 57c that enhances the polarization separation characteristic of the polarization beam splitter 55c; and the half-wavelength plate 58p that is disposed on the most-outgoing-side. This liquid crystal light valve 25c is uniformly illuminated by the R beams that are reflected by the second dichroic mirror unit 31b and are transmitted through the dichroic mirror 23b. In the liquid crystal light valve 25c, a polarization separation element film 32c of the polarization beam splitter 55c selectively reflects linearly polarized light, which is polarized in the first polarization direction perpendicular to the surface of the figure, of the incident R beams so as to be guided to the liquid crystal unit 26c. The liquid crystal unit 26c is an embodiment of an electro-optical display device. The liquid crystal unit 26c converts the incident linearly polarized light polarized in the first polarization direction, for example, into linearly polarized light polarized in the second polarization direction that is partially parallel to the surface of the figure in accordance with an image signal and reflects the converted polarized light toward the polarization beam splitter 55c. The polarization separation element film 32c of the polarization beam splitter 55c selectively transmits only the linearly polarized light, which is modulated through the liquid crystal unit 26c, polarized in the second polarization direction. At this time, the extinction ratio of the outgoing side of the polarization beam splitter 55c can be raised by the clean-up polarizing plate 57c. Accordingly, the contrast of the modulated light can be enhanced. The half-wavelength plate 58p rotates the polarization direction of the linearly polarized light, which is transmitted through the polarization separation element film 32c of the polarization beam splitter 55c, polarized in the second polarization direction by 90 degrees so as to be converted into linearly polarized light polarized in the first polarization direction perpendicular to the surface of the figure.

Figure 2:
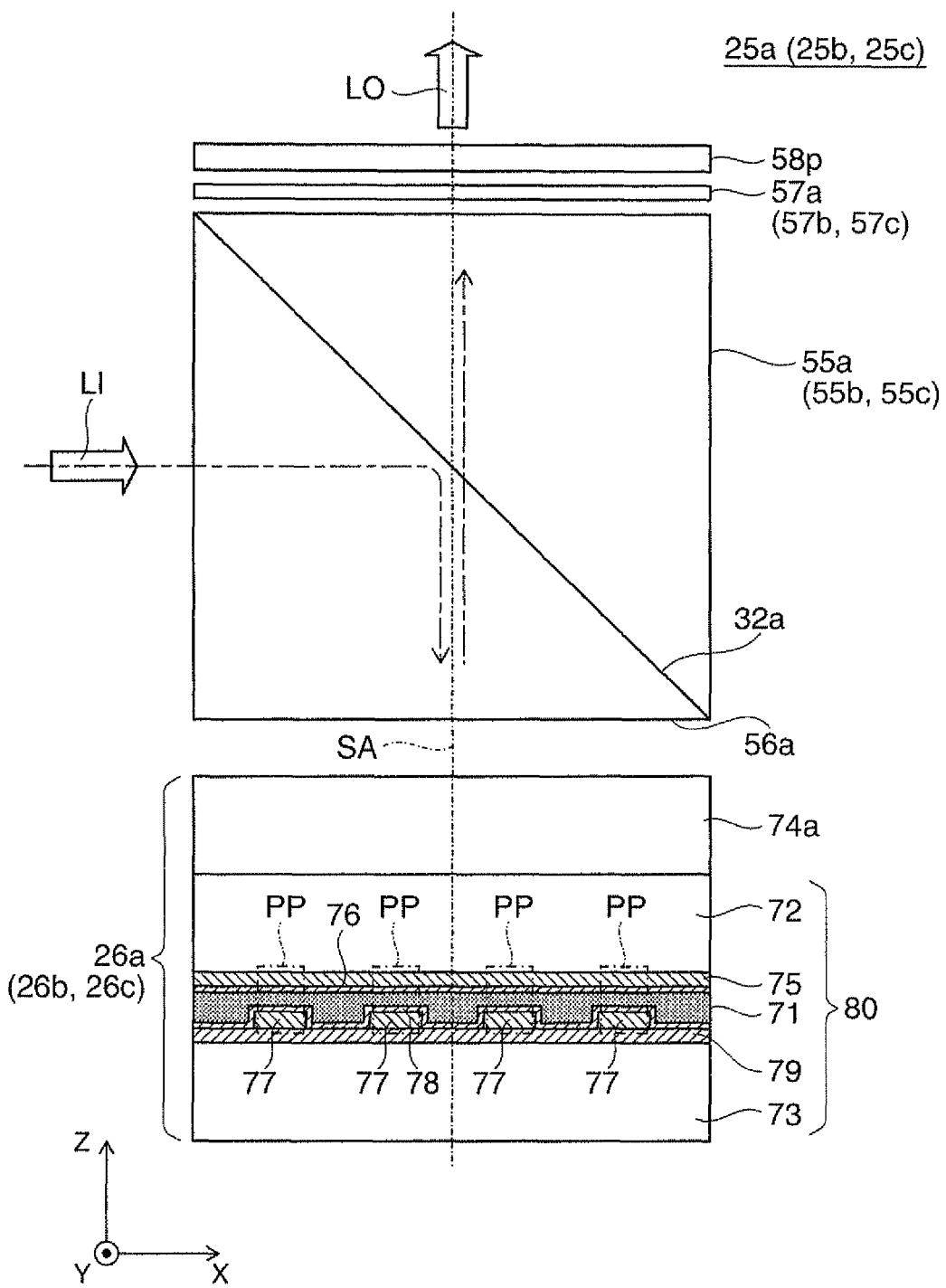
FIG. 2 is an enlarged cross-sectional view of a liquid crystal light valve for B beams and the like that configure the projector shown in FIG. 1.

FIG. 2 is an enlarged cross-sectional view illustrating a detailed structure of the liquid crystal light valve 25a for the B light and the like that configure the optical modulation unit 25 of the projector 10 shown in FIG. 1. In the liquid crystal light valve 25a, a portion acquired by excluding a dust-protective substrate 74a from the liquid crystal unit 26a used for optical modulation forms a liquid crystal panel 80 as a main body. In FIG. 1, a Z-axis direction corresponds to a direction in which a system optical axis SA extends. In addition, the X direction corresponds to a direction that is perpendicular to a line of intersection of the first and second dichroic mirrors 27a and 27b of the cross dichroic prism 27 and the Z axis. The Y direction corresponds to a direction that is parallel to the line of intersection of the first and second dichroic mirrors 27a and 27b.

The liquid crystal unit 26a converts an incident light LI that is reflected by the polarization separation element film 32a of the polarization beam splitter 55a and is incident through a device opposing face 56a from S-polarized light that is partially perpendicular to the surface of the figure to P-polarized light that is parallel to the surface of the figure in units of pixels in accordance with an input signal and outputs the modulated light after change toward the device opposing face 56a of the polarization beam splitter 55a as an outgoing light LO. As described above, by passing the modulated light, which is output from the liquid crystal light valve 25a and travels in a straight line through the polarization separation element film 32a of the polarization beam splitter 55a, through the half-wavelength plate 58p, the outgoing light LO in the S-polarized state that is appropriate for light composition in the cross dichroic prism 27 to be described later is formed.

The liquid crystal panel 80 has an opposing substrate 72 on the incident side and a driving substrate 73, on which a reflective layer is disposed, with a liquid crystal layer 71, which is configured by, for example, a liquid crystal operating in a vertical alignment mode (that is, vertically-aligned liquid crystal), interposed therebetween. Both the opposing substrate 72 and the driving substrate 73 have a flat-plate shape and have a normal line of the incident and outgoing faces disposed parallel to the system optical axis SA, that is, the Z axis. On the light-incident side of the liquid crystal panel 80, that is, on the outer side of the opposing substrate 72 that is disposed on a side opposite to the liquid crystal layer 71, a dust-protective substrate 74a that is an light-transmissive substrate is attached. The dust-protective substrate 74a has a flat plate shape. Similarly to the opposing substrate 72, the dust-protective substrate 74a has a normal line of the incident and outgoing face disposed parallel to the system optical axis SA, that is, the Z axis.

In the liquid crystal panel 80, on a face of the opposing substrate 72 that is disposed on the liquid crystal layer 71 side, a transparent common electrode 75 is disposed. In addition, on the common electrode 75, for example, an alignment film 76 is formed. On the other hand, on a face of the driving substrate 73 that is disposed on the liquid crystal layer 71 side, a plurality of reflective pixel electrodes 77 as display electrodes disposed in a matrix shape through a circuit layer 79 for driving display are disposed. The reflective pixel electrodes 77 configure a reflective layer. On the circuit layer 79 for driving display, although detailed description thereof is omitted, wirings (not shown) that can be electrically connected respectively to the reflective pixel electrodes 77 and thin film transistors (not shown) that are interposed between the reflective pixel electrodes 77 and the wirings are disposed. In addition, on the circuit layer 79 and the reflective pixel electrodes 77, for example, an alignment film 78 is formed. Each pixel portion PP configuring the liquid crystal panel 80 includes one reflective pixel electrode 77, a portion of the common electrode 75, portions of both the alignment films 76 and 78, and a portion of the liquid crystal layer 71. The liquid crystal panel 80 serves as an optical active device for modulating the polarization state of the incident light LI in accordance with an input signal.

In the above-described liquid crystal panel 80, the alignment films 76 and 78 have a function of arranging liquid crystal compounds configuring the liquid crystal layer 71 to be approximately parallel to the system optical axis SA, that is, the Z axis in the state in which an electric field is not formed. However, in a case where an appropriate electric field is formed in the direction along the Z axis, the liquid crystal compounds configuring the liquid crystal layer 71 are tilted, for example, toward a predetermined azimuth within the XY plane from the state being approximately parallel to the system optical axis SA, that is, the Z axis. Accordingly, the liquid crystal layer 71 is operated in a normally-black mode. Therefore, a maximum light-shielding state (light-off state) can be acquired in the off-state in which a voltage is not applied. In other words, the liquid crystal panel 80, that is, the liquid crystal unit 26a directly reflects S-polarized light without any change at the time of black display of the light-off state. In addition, the liquid crystal panel 80, that is, the liquid crystal unit 26a changes the S-polarized light to P-polarized light and reflects the P-polarized light at the time of white display of the light-on state.

Figure 3:
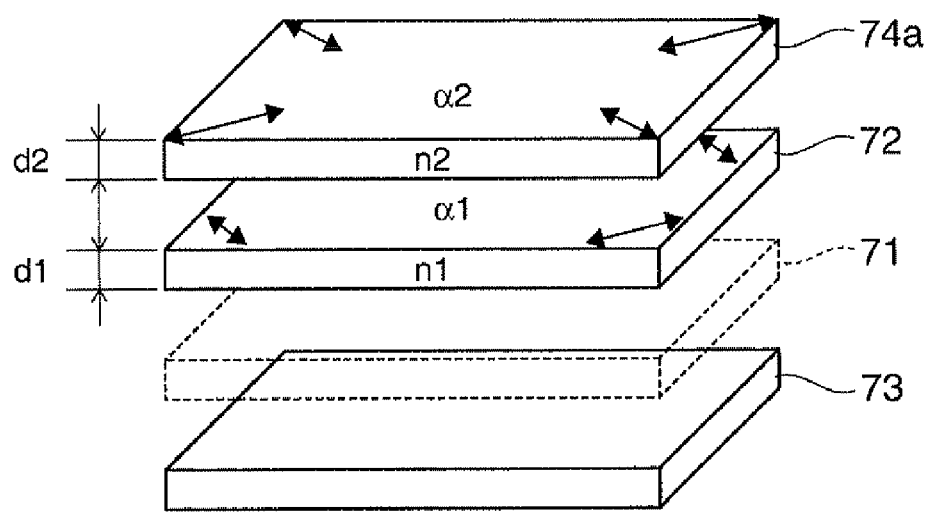
FIG. 3 is a perspective view illustrating the materials, the states, and the like of a plurality of element substrates configuring the liquid crystal unit.

FIG. 3 is a perspective view illustrating the materials, the states, and the like of the plurality of element substrates, which have optical transparency, configuring the liquid crystal unit 26a. In this case, materials are selected such that one of the values of the thermal expansion coefficients of the opposing substrate 72 and the dust-protective substrate 74a is negative, and the other is positive. As materials having negative thermal expansion coefficients, for example, there are Neoceram (registered trademark) N-O having the average linear expansion coefficient of $-5.5 \times 10^{-7}$ [/K] and the like. In addition, as materials having positive thermal expansion coefficients, for example, there are silica glass having the average linear expansion coefficient of $5.5 \times 10^{-7}$ [/K], 7971 titanium silicate glass, which has the average linear expansion coefficient of $0.3 \times 10^{-7}$ [/K], manufactured by Corning Incorporated, Pyrex (registered trademark) having the average linear expansion coefficient of $32.5 \times 10^{-7}$ [/K], 7913 95% silicate glass, which has the average linear expansion coefficient of $7.5 \times 10^{-7}$ [/K], manufactured by Corning Incorporated, sapphire glass having the average linear expansion coefficient of $53 \times 10^{-7}$ [/K], whiteboard glass having the average linear expansion coefficient of $93 \times 10^{-7}$ [/K], and the like. In particular, the opposing substrate 72 is formed from silica glass having a positive thermal expansion coefficient or the like, and the dust-protective substrate 74a is formed from Neoceram (registered trademark) having a negative thermal expansion coefficient, or the like.

Figure 4A:
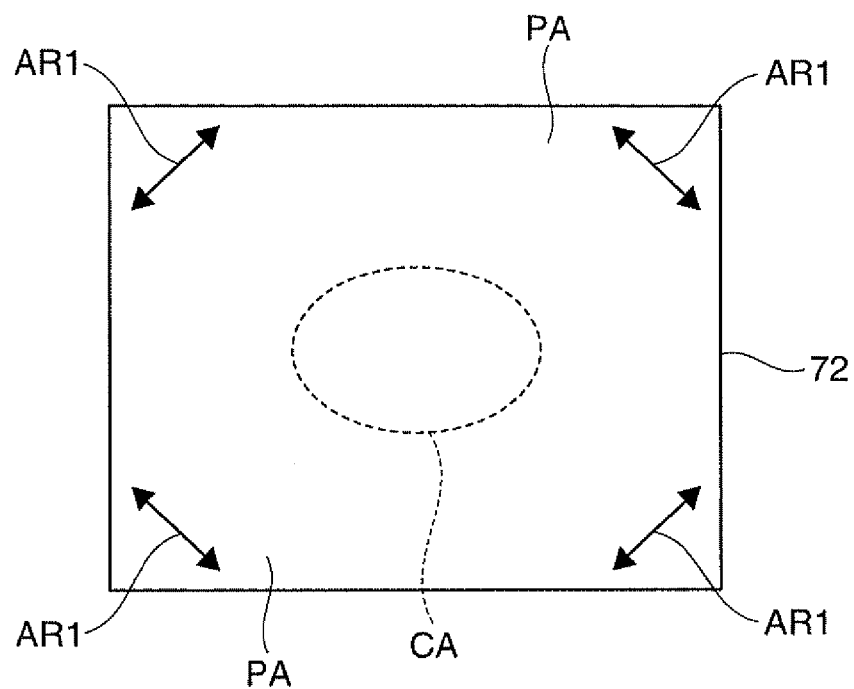
FIG. 4A is a diagram illustrating the operation state of an opposing substrate.

FIG. 4A is a diagram illustrating the operation state of the opposing substrate 72. When a display operation is performed by irradiating illumination light onto the liquid crystal light valve 25a, for example, a center area CA of the opposing substrate 72 is heated, and the temperature of the center area CA is higher in comparison to that of a peripheral area PA. In such a case, since the thermal expansion coefficient of the opposing substrate 72 has a positive value, the center area CA expands. As a result, in the peripheral area PA, pressurizing distortion occurs, and birefringence due to the distortion is formed. A slow axis AR1 due to the birefringence approximately follows the peripheral direction that is perpendicular to the radial direction extending from the center. Accordingly, particularly in portions of four corners of the opposing substrate 72, the slow axis AR1 is formed in the direction perpendicular to the diagonal direction.

Figure 4B:
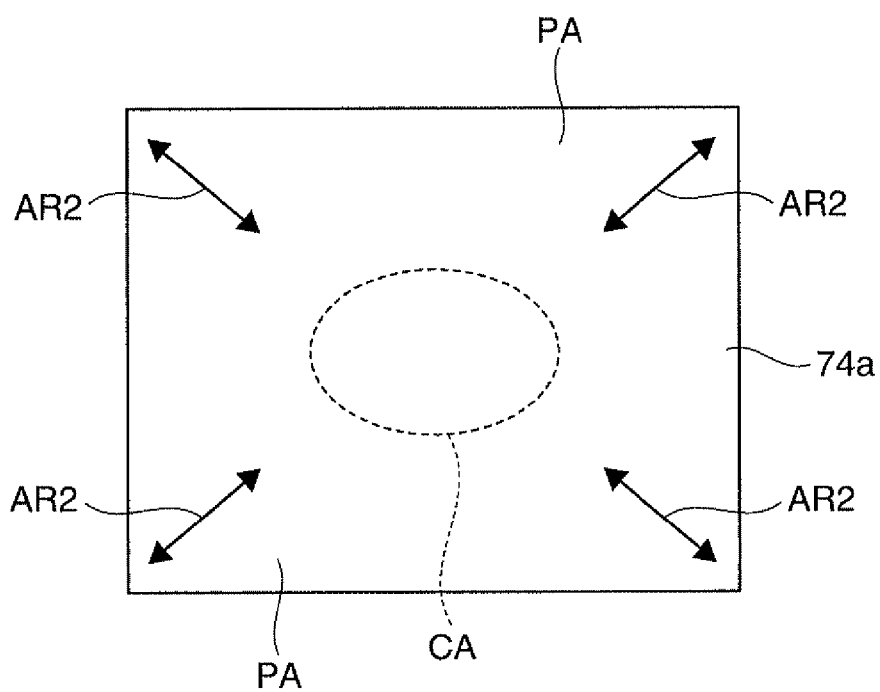
FIG. 4B is a diagram illustrating the operation state of a dust-protective substrate.

FIG. 4B is a diagram illustrating the operation state of the dust-protective substrate 74a. When a display operation is performed by irradiating illumination light onto the liquid crystal light valve 25a, for example, a center area CA of the dust-protective substrate 74a located adjacent to the opposing substrate 72 is also heated, and the temperature of the center area CA is higher in comparison to a peripheral area PA. In such a case, since the thermal expansion coefficient of the dust-protective substrate 74a has a negative value, the center area CA contracts. As a result, in the peripheral area PA, pulling distortion occurs, and birefringence due to the distortion is formed. A slow axis AR2 due to the birefringence approximately follows the radial direction extending from the center. Accordingly, particularly in four corner portions of the dust-protective substrate 74a, the slow axis AR2 is formed in the diagonal direction.

A case in which the temperature of the center areas CA of the opposing substrate 72 and the dust-protective substrate 74a rise has been described as above. However, as long as a common temperature distribution is formed in the element substrates 72 and 74a having the optical transparency, the center areas CA do not need to be at a high temperature.

Here, the slow axis AR1 of the opposing substrate 72 and the slow axis AR2 of the dust-protective substrate 74a are approximately perpendicular to each other. Accordingly, an unintended phase difference generated by the dust-protective substrate 74a tends to be offset by an unintended phase difference generated by the opposing substrate 72. In particular, by having the magnitude of the phase difference generated by the opposing substrate 72 and the magnitude of the phase difference generated by the dust-protective substrate 74a to approximately coincide with each other, a phenomenon in which polarization is disturbed at a time when illumination light passes through the opposing substrate 72 and the dust-protective substrate 74a as a forward path can be reduced. Accordingly, polarized light having a desired state can be incident to the liquid crystal layer 71. In addition, also for the modulated light that is reflected from the driving substrate 73 side and reciprocates through the liquid crystal layer 71, a phenomenon in which polarization is disturbed at a time when the light passes through the opposing substrate 72 and the dust-protective substrate 74a as a returning path can be reduced. Accordingly, polarized light that is in an accurately-modulated state can be extracted from the liquid crystal unit 26a. Therefore, the phase modulation, which is performed by the liquid crystal unit 26a, can be appropriately performed. Accordingly, the modulated light of the B color that is output from the liquid crystal light valve 25a can have a precise distribution of illuminance.

Figure 5A:
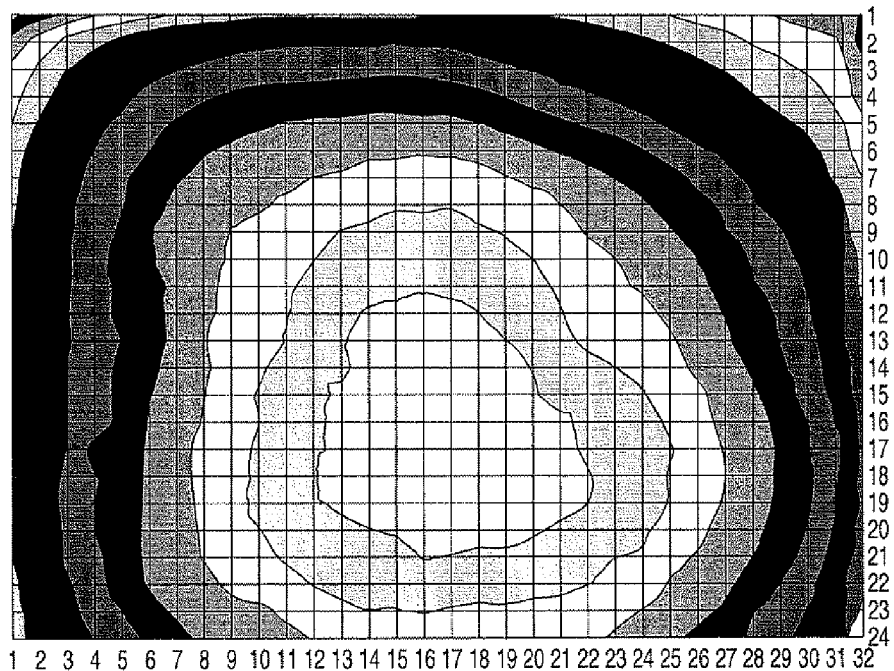
FIG. 5A represents the illuminance distribution of a projection image projected by a liquid crystal light valve according to an example.
Figure 5B:
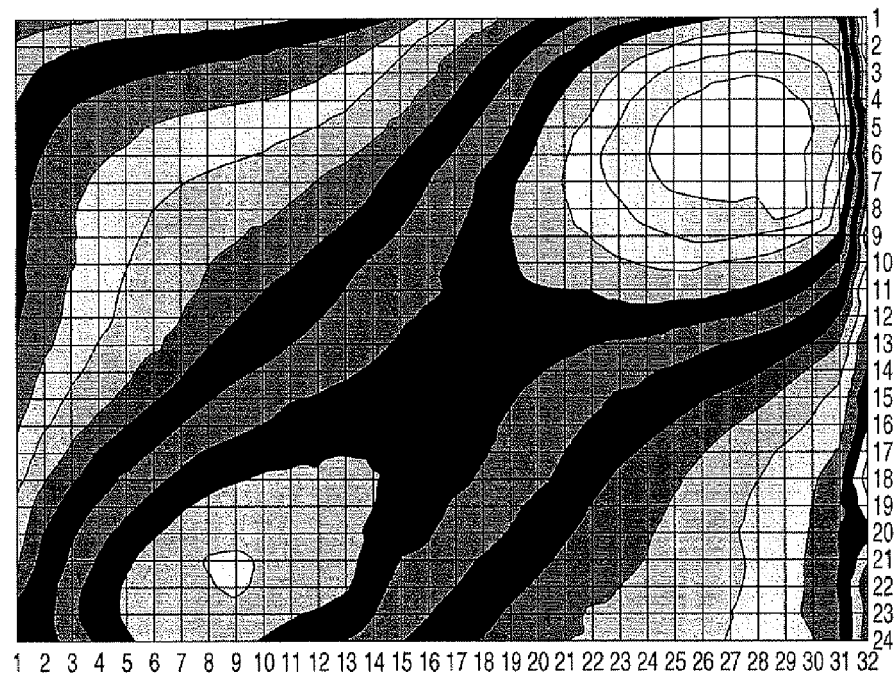
FIG. 5B represents the illuminance distribution of a projection image projected by a liquid crystal light valve according to a comparative example.

FIG. 5A represents an illuminance distribution on a screen when a liquid crystal light valve 25a and the like of Example 1, to be described later, are in the light-shielding state. FIG. 5B represents an illuminance distribution on the screen when a liquid crystal light valve of a comparative example in which the opposing substrate 72 and the dust-protective substrate 74a are made from quartz is in the light-shielding state. As is apparent from both figures, a relatively flat illuminance distribution is acquired by the liquid crystal light valve 25a and the like of Example 1, and display unevenness can be described to be relatively small. However, an illuminance distribution that is biased in the diagonal direction and the like is generated by the liquid crystal light valve of the comparative example, and display unevenness can be described to be relatively large.

Hereinafter, a concrete example will be described. In this example, display unevenness was evaluated while the refractive indices, the thicknesses, and the thermal expansion coefficients of the opposing substrate 72 and the dust-protective substrate 74a configuring the liquid crystal light valve 25a and the like are appropriately changed. The following Table 1 is acquired by collecting data of Examples 1 to 7 and a comparative example. In the comparative example, all the elements substrates 72 and 74a having optical transparency are made from quartz.

TABLE 1

|  |  |  |  | Comparative Example | Example 1 | Example 2 | Example 3 | Example 4 | Example 5 | Example 6 | Example 7 |
|---|---|---|---|---|---|---|---|---|---|---|---|
| Opposing substrate | Material |  |  | quartz | quartz | Neoceram | Neoceram | quartz | Neoceram | quartz | Neoceram |
|  | Average linear expansion coefficient | α1 | ×10⁻⁷/k | 5.5 | 5.5 | −6.0 | −6.0 | 5.5 | −6.0 | 5.5 | −6.0 |
|  | Thickness | d1 | mm | 1.1 | 1.1 | 1.1 | 1.0 | 1.1 | 1.1 | 1.7 | 1.7 |
|  | Refractive index | n1 |  | 1.541 | 1.459 | 1.541 | 1.541 | 1.459 | 1.541 | 1.459 | 1.541 |
| Dust-protective substrate | Material |  |  | quartz | Neoceram | quartz | quartz | Neoceram | quartz | Neoceram | Pyrex |
|  | Average linear expansion coefficient | α2 | ×10⁻⁷/k | 5.5 | −6 | 5.5 | 5.5 | −6 | 5.5 | −6 | 32.5 |
|  | Thickness | d2 | mm | 1.1 | 1.1 | 1.1 | 1.1 | 1 | 0.8 | 1.1 | 0.55 |
|  | Refractive index | n2 |  | 1.459 | 1.541 | 1.459 | 1.459 | 1.541 | 1.459 | 1.541 | 1.474 |
| $d1 \cdot \alpha1 + d2 \cdot \alpha2$ |  |  | ×10⁻⁷ mm/k | 12.10 | −0.55 | −0.55 | 0.05 | 0.05 | −2.20 | 2.75 | 7.68 |
| $n1 \cdot d1 \cdot \alpha1 + n2 \cdot d2 \cdot \alpha2$ |  |  | ×10⁻⁷ mm/k | 18.15 | −1.34 | −1.34 | −0.42 | −0.42 | −3.75 | 3.47 | 10.63 |
| Display unevenness |  |  |  | bad | good | good | excellent | excellent | good | not bad | within allowed range |
| $d1 \cdot \alpha1$ |  |  | ×10⁻⁷ mm/k | 6.05 | 6.05 | −6.60 | −6.00 | 6.05 | −6.60 | 9.35 | −10.20 |
| $d2 \cdot \alpha2$ |  |  | ×10⁻⁷ mm/k | 6.05 | −6.60 | 6.05 | 6.05 | −6.00 | 4.40 | −6.60 | 17.88 |
| Absolute value of minimum value | \|pm\| |  | ×10⁻⁷ mm/k | 6.05 | 6.60 | 6.60 | 6.00 | 6.00 | 6.60 | 6.60 | 10.20 |
| Absolute value of maximum value | \|pp\| |  | ×10⁻⁷ mm/k | 6.05 | 6.05 | 6.05 | 6.05 | 6.05 | 4.40 | 9.35 | 17.88 |
| Difference between absolute value of minimum value and absolute value of maximum value | \|dm\| |  | ×10⁻⁷ mm/k | 0.00 | 0.55 | 0.55 | 0.05 | 0.05 | 2.20 | 2.75 | 7.68 |

As is apparent from Table 1, it can be noticed that display unevenness is suppressed to some degree so as not to cause any problem in any of Examples 1 to 7. In particular, in the case of Example 7, although Pyrex (registered trademark) having a thermal expansion coefficient quite higher than that of silica glass or the like is used, display unevenness is within an allowed range.

In order to assuredly decrease the display unevenness of the liquid crystal light valve 25a, a phase difference generated as a whole, which is acquired by combining a phase difference generated by the dust-protective substrate 74a with a phase difference generated by the opposing substrate 72, may be decreased. In order to decrease the phase difference generated as a whole, first, the thermal expansion coefficients of the opposing substrate 72 and the dust-protective substrate 74a are assumed to be α1 and α2, respectively, the refractive indices of the opposing substrate 72 and the dust-protective substrate 74a are assumed to be n1 and n2, respectively, and the thickness values of the opposing substrate 72 and the dust-protective substrate 74a are assumed to be d1 and d2, respectively. Here, as the thermal expansion coefficients, average linear expansion coefficients of the materials of the two element substrates 72 and 74a having optical transparency can be used. Then, the refractive indices n1 and n2 are set to be within the range of 1.5±0.1. In addition, a value C1 of a product-sum operation relating to the thicknesses and the thermal expansion coefficients of the two element substrates 72 and 74a having optical transparency is acquired.

$$C1 = d1 \cdot \alpha 1 + d2 \cdot \alpha 2 \quad (1)$$

Then, the thicknesses and the thermal expansion coefficients are set such that the value of C1 is within the range of $0 \pm 9 \times 10^{-7}$ [mm/K]. In such a case, an unintended phase difference given to the luminous flux passing through the two element substrates 72 and 74a having optical transparency can be decreased in consideration of the thicknesses and the thermal expansion coefficients.

In addition, by acquiring the value C1 of the product-sum operation relating to the thicknesses and the thermal expansion coefficients of the two element substrates 72 and 74a having optical transparency and setting the thicknesses and the thermal expansion coefficients such that the value of $C1 = d1 \cdot \alpha 1 + d2 \cdot \alpha 2$ is within the range of $0 \pm 4 \times 10^{-7}$ [mm/K], the occurrence of the phase difference can be further suppressed.

In the above-described case, the range limiting in which the refractive indices of the two element substrates 73 and 74a having optical transparency are additionally used is not performed. However, by including the refractive indices, more precise range limitation can be applied. In other words, a value C2 of a product-sum operation relating to the refractive indices, the thicknesses, and the thermal expansion coefficients of the two element substrates 72 and 74a having optical transparency is acquired.

$$C2 = n1 \cdot d1 \cdot \alpha 1 + n2 \cdot d2 \cdot \alpha 2 \quad (2)$$

The refractive indices, the thicknesses, and the thermal expansion coefficients are set such that the value of C2 is within the range of $0 \pm 12 \times 10^{-7}$ [mm/K]. In such a case, an unintended phase difference given to the luminous flux passing through the two element substrates 72 and 74a having optical transparency can be assuredly decreased in consideration of the refractive indices, the thicknesses, and the thermal expansion coefficients.

In addition, by acquiring the value C2 of the product-sum operation relating to the refractive indices, the thicknesses, and the thermal expansion coefficients of the two element substrates 72 and 74a having optical transparency and setting the refractive indices, the thicknesses, and the thermal expansion coefficients such that the value of $C2 = n1 \cdot d1 \cdot \alpha 1 + n2 \cdot d2 \cdot \alpha 2$ is within the range of $0 \pm 5 \times 10^{-7}$ [mm/K], the occurrence of the phase difference can be further suppressed.

Although the detailed description is omitted, in the above-described liquid crystal unit 26a, the thermal expansion coefficient of the opposing substrate 72 is positive, and the thermal expansion coefficient of the dust-protective substrate 74a is negative. However, the thermal expansion coefficients may be interchanged. In such a case, the thermal expansion coefficient of the opposing substrate 72 is negative, and the thermal expansion coefficient of the dust-protective substrate 74a is positive.

In the description above, the liquid crystal unit 26a is configured to include two element substrates having optical transparency, that is, the opposing substrate 72 and the dust-protective substrate 74a, However, the liquid crystal unit 26a may be configured so as to include three or more element substrates, which have optical transparency, stacked together. Even in such a case, the above-described product-sum operation value C1 or a similar product-sum operation value C1' to be described below is configured to be within the range of $0 \pm 8.5 \times 10^{-7}$ [mm/K], and preferably, to be within the range of $0 \pm 3 \times 10^{-7}$ [mm/K]. In addition, the above-described product-sum operation value C2 or a similar product-sum operation value C2' to be described below is configured to be within the range of $Q \pm 12 \times 10^{-7}$ [mm/K], and preferably, to be within the range of $0 \pm 4.5 \times 10^{-7}$ [mm/K]. Accordingly, the occurrence of display unevenness due to the liquid crystal unit 26a can be decreased. Hereinbefore, the product-sum operation value C1' is given in the following Equation (3)

$$C1' = \Sigma (dk \cdot \alpha k) \quad (3)$$

Here, dk is the thickness of each element substrate, αk is the thermal expansion coefficient of each element substrate, and k is a number increased from 1 to m (here, m is a total number of element substrates).

In addition, the product-sum operation value C2' is given in the following Equation (4).

$$C2' = \Sigma (nk \cdot dk \cdot \alpha k) \quad (4)$$

Here, nk is the refractive index of each element substrate, dk is the thickness of each element substrate, αk is the thermal expansion coefficient of each element substrate, and k is a number increased from 1 to m (here, m is a total number of element substrates).

In a case where the number of the element substrates such as the opposing substrate 72 and the incident-side dust-protective substrate 74a having optical transparency that are built in the liquid crystal unit 26a is three or more, when a positive maximum value is Pp and a negative minimum value is Pm that are acquired based on comparison of products of the thicknesses and the thermal expansion coefficients of the element substrates, an advantage in that display unevenness is suppressed can be acquired by allowing a maximum value difference DM to satisfy the following condition.

$$DM = |Pp| - |Pm| \leq 9 \times 10^{-7} \text{ [mm/K]} \quad (5)$$

In other words, by configuring the maximum value difference DM to be a relatively small value, a phase difference amount generated by an element substrate having the optical transparency representing the positive maximum value Pp and a phase difference amount generated by an element substrate having the optical transparency representing the negative minimum value Pm can be relatively balanced with each other, and thereby the occurrence of display unevenness can be suppressed.

The structure and the function of the liquid crystal light valve 25a for the B beams have been described with reference to FIG. 2 and the like. However, the liquid crystal light valve 25c for R beams has the structure and the function that are the same as those of the liquid crystal light valve 25a for the B beams. In other words, as shown in FIG. 2 and the like, only S-polarized light is selectively reflected by the polarization beam splitter 55c, the S-polarized light is converted into P-polarized light by performing modulation using the liquid crystal unit 26c, and only the P-polarized light is selectively transmitted through the polarization beam splitter 55c. Then, by passing the modulated light, which travels in a straight line through the polarization beam splitter 55c, through the half-wavelength plate 58p, the modulated light outgoing from the liquid crystal light valve 25c can be converted into the outgoing light LO that is in the S-polarized state. At this time, by appropriately setting the thicknesses, the thermal expansion coefficients, and the like of the element substrates 72 and 74a, which have optical transparency, configuring the liquid crystal unit 26c of the liquid crystal light valve 25c, the occurrence of an unintended phase difference is prevented. Accordingly, the occurrence of display unevenness can be suppressed.

The liquid crystal light valve 25b for G beams, as shown in FIG. 2 and the like, has the structure and the function that are basically the same as the liquid crystal light valve 25a for the B beams and the like. However, there is a difference in that the half-wavelength plate 58p is not included in the liquid crystal light valve 25b for the G beams. In such a case, only S-polarized light is selectively transmitted through the polarization beam splitter 55b and is modulated by the liquid crystal unit 26b so as to be converted into P-polarized light from the S-polarized light. Then, only the P-polarized light is selectively transmitted through the polarization beam splitter 55e. Accordingly, the modulated light output from the liquid crystal light valve 25b can be converted into the outgoing light LO that is in the P-polarized state. At this time, by appropriately setting the thicknesses, the thermal expansion coefficients, and the like of the element substrates 72 and 74a, which have optical transparency, configuring the liquid crystal unit 26b of the liquid crystal light valve 25b, the occurrence of an unintended phase difference is prevented. Accordingly, the occurrence of display unevenness can be suppressed.

Referring back to FIG. 1, the cross dichroic prism 27 corresponds to a light-composition optical system. The cross dichroic prism 27 forms an approximately square shape in plan view by bonding four rectangular prisms. In addition, on the boundary faces formed by bonding the rectangular prisms, one pair of the dichroic mirrors 27a and 27b intersecting with each other in the "X" shape are formed. Both the dichroic mirrors 27a and 27b are formed as multi-layer dielectric films having different characteristics. In other words, the first dichroic mirror 27a as one of the dichroic mirrors 27a and 27b reflects B beams, and the second dichroic mirror 27b as the other dichroic mirror reflects R beams. This cross dichroic prism 27 reflects the B beams after modulation that are output from the liquid crystal light valve 25a by using the first dichroic mirror 27a so as to be output to the right side in the traveling direction, outputs the G beams after modulation that are output linearly from the liquid crystal light valve 25b through the first and second dichroic mirrors 27a and 27b, and reflects the R beams after modulation that are output from the liquid crystal light valve 25c by using the second dichroic mirror 27b so as to be output to the left side in the traveling direction. In addition, as described above, the first and second dichroic mirrors 27a and 27b reflect the B beams and the R beams that are in the S-polarized state perpendicular to the surface of the figure, and both the dichroic mirrors 27a and 27b transmit the G beams that are in the P-polarized state parallel to the surface of the figure. Accordingly, the composition efficiency of BGR beams in the cross dichroic prism 27 can be raised, and whereby the occurrence of color unevenness can be suppressed.

The projection lens 29 projects image light of a color synthesized by the cross dichroic prism 27 as a projection unit or a projection optical system on a screen (not shown) with a desired multiplication factor. In other words, a color moving picture or a color still image corresponding to driving signals or image signals that are input to the liquid crystal units 26a to 26c is projected with a desired multiplication factor on the screen.

As is apparent from the description presented above, according to the projector 10 of this embodiment, in the electro-optical display devices, that is, the liquid crystal units 26a, 26b, and 26c that are built in the projector 10, any one or more of values of the thermal expansion coefficients of the plurality of element substrates, which have optical transparency, configured to include the opposing substrate 72, the dust-protective substrate 74a as the light-transmissive substrate, and the like are negative, and any one or more of the values are positive. As a result, a phase difference given to passing light due to distortion generated due to a temperature distribution within the element substrate having a negative thermal expansion coefficient and a phase difference given to passing light due to distortion generated due to a temperature distribution within the element substrate having a positive thermal expansion coefficient are operated so as to be offset. Accordingly, the effect of a decrease in the phase difference that is achieved by the plurality of element substrates 72 and 74a having optical transparency as a whole can be greater than the effect of a decrease in the phase difference that is achieved by a decrease in distortion of the individual element substrates 72 and 74a having optical transparency. Therefore, the display unevenness of the liquid crystal units 26a, 26b, and 26c can be further suppressed.

The embodiment of the invention has been described as above. However, the invention is not limited to the above-described embodiment and may be performed in various forms in the range not departing from the basic concept thereof. For example, the following modifications can be made.

In other words, in the above-described embodiment, in the liquid crystal units 26a, 26b, and 26c, the dust-protective substrate 74a as the light-transmissive substrate is disposed on the outer side of the liquid crystal panel 80. However, as the light-transmissive substrate configuring the liquid crystal unit, a substrate other than the dust-protective substrate 74a can be disposed. In particular, instead of the dust-protective substrate 74a, cover glass, a touch panel substrate, or the like can be disposed. In such a case, by adjusting the thermal expansion coefficients, the thicknesses, and the like of the element substrates having optical transparency, the display unevenness generated by the liquid crystal unit (for example, a direct-view-type display device disposed inside a vehicle) can be decreased.

In addition, in the above-described embodiment, the vertically-aligned liquid crystal layer 71 is used as the liquid crystal panel 80. However, a twist nematic-type liquid crystal layer 71 can be used.

In addition, in the above-described embodiment, the shape of the opposing substrate 72, the dust-protective substrate 74a, and the like is a rectangle. However, even when the element substrates 72 and 74a, which have optical transparency, have a shape of a square or any other shape, the same advantages can be acquired.

In the above-described embodiment, the light output from the lens array 21e is converted into linearly polarized light polarized, for example, in the first polarization direction that is perpendicular to the surface of FIG. 1 by the polarization converting member 21g, and the half-wavelength plate 58p is disposed on the light-outgoing side of the liquid crystal light valves 25a and 25c for the B and R beams that are reflected by the dichroic mirrors 27a and 27b of the cross dichroic prism 27. However, it may be configured that the light output from the lens array 21e is converted into linearly polarized light polarized, for example, in the second polarization direction that is parallel to the surface of FIG. 1 by the polarization converting member 21g, and the half-wavelength plate is disposed on the light-outgoing side or the light-incident side of the liquid crystal light valve 25b for the G beams that are transmitted through the dichroic mirrors 27a and 27b of the cross dichroic prism 27. At this time, for example, the polarization beam splitters 55a, 55b, and 55c branch the modulated light by reflection.

In the projectors 10 of the above-described embodiment, the light source device 21 is configured by the light source lamp 21a, one pair of the lens arrays 21d and 21e, the polarization converting member 21g, and the composite lens 21i. However, the lens arrays 21d and 21e and the like may be omitted, and the light source lamp 21a may be substituted by a separate light source such as an LED.

In the above-described embodiment, only examples in which the projector 10 uses three liquid crystal light valves 25a, 25b, and 25c have been described. However, the invention can be applied to a projector using one or two liquid crystal light valves or a projector using four or more liquid crystal light valves.

In the above described embodiment, only examples of the front-type projectors in which projection is performed from the observation side of the screen have been described. However, the invention can be applied to a rear-type projector in which projection is performed from the side opposite to the observation side of the screen.

What is claimed is:

1. An electro-optical display device comprising:
    a reflection-type liquid crystal panel including a driving substrate, a reflective layer disposed on the driving substrate, an opposing substrate having an outer side opposite the driving substrate, and a liquid crystal disposed between the driving substrate and the opposing substrate;
    a light-transmissive substrate disposed on the outer side of the opposing substrate; and
    a plurality of element substrates including at least the opposing substrate and the light-transmissive substrate, at least one substrate of the plurality of element substrates having negative thermal expansion coefficients and at least another substrate of the plurality of element substrates having positive thermal expansion coefficients, wherein
        under the condition that the thermal expansion coefficients of the opposing substrate and the light-transmissive substrate are $\alpha 1$ and $\alpha 2$, respectively,
        refractive indices of the opposing substrate and the light-transmissive substrate are n1 and n2, respectively, and
        thicknesses of the opposing substrate and the light-transmissive substrate are d1 and d2, respectively, the refractive indices n1 and n2 being within the range of 1.5±0.1, and a product sum operation value $d1 \cdot \alpha 1 + d2 \cdot \alpha 2$ of the thicknesses and the thermal expansion coefficients being within the range of $0 \pm 9 \times 10^{-7}$ [mm/K].

2. The electro-optical display device according to claim 1, the product sum operation value $d1 \cdot \alpha 1 + d2 \cdot \alpha 2$ of the thicknesses and the thermal expansion coefficients being within the range of $0 \pm 4 \times 10^{-7}$ [mm/K].

3. The electro-optical display device according to claim 1, a product sum operation value $n1 \cdot d1 \cdot \alpha 1 + n2 \cdot d2 \cdot \alpha 2$ of the refractive indices, the thicknesses, and the thermal expansion coefficients being within the range of $0 \pm 12 \times 10^{-7}$ [mm/K].

4. The electro-optical display device according to claim 1, the product sum operation value $n1 \cdot d1 \cdot \alpha 1 + n2 \cdot d2 \cdot \alpha 2$ of the refractive indices, the thicknesses, and the thermal expansion coefficients being within the range of $0 \pm 5 \times 10^{-7}$ [mm/K].

5. A projector comprising:
    at least one or more of the electro-optical display devices according to claim 1;
    an illumination device that illuminates the at least one or more of the electro-optical display devices; and
    a projection lens that projects an image formed by the at least one or more of the electro-optical display devices.

6. An electro-optical display device comprising:
    a reflection-type liquid crystal panel including a driving substrate, a reflective layer disposed on the driving substrate, an opposing substrate having an outer side opposite the driving substrate, and a liquid crystal disposed between the driving substrate and the opposing substrate;
    a light-transmissive substrate disposed on the outer side of the opposing substrate; and
    a plurality of element substrates including at least the opposing substrate and the light-transmissive substrate, at least one substrate of the plurality of element substrates having a first unintended phase difference effect on light, and at least another substrate of the plurality of element substrates having a second unintended phase difference effect on light, the second unintended phase difference effect coincides with the first unintended phase difference effect, wherein
        under the condition that the thermal expansion coefficients of the opposing substrate and the light-transmissive substrate are $\alpha 1$ and $\alpha 2$, respectively,
        refractive indices of the opposing substrate and the light-transmissive substrate are n1 and n2, respectively, and
        thicknesses of the opposing substrate and the light-transmissive substrate are d1 and d2, respectively, the refractive indices n1 and n2 being within the range of 1.5±0.1, and a product sum operation value $d1 \cdot \alpha 1 + d2 \cdot \alpha 2$ of the thicknesses and the thermal expansion coefficients being within the range of $0 \pm 9 \times 10^{-7}$ [mm/K].

7. A projector comprising:
    at least one or more of the electro-optical display devices according to claim 6;
    an illumination device that illuminates the at least one or more of the electro-optical display devices; and
    a projection lens that projects an image formed by the at least one or more of the electro-optical display devices.

* * * * *